United States Patent
Washino

(10) Patent No.: US 11,279,820 B2
(45) Date of Patent: Mar. 22, 2022

(54) COMPOSITION, METHOD FOR PRODUCING HEAT-RESISTANT VIBRATION-PROOF MATERIAL, AND HEAT-RESISTANT VIBRATION-PROOF MATERIAL

(71) Applicant: KITAGAWA INDUSTRIES CO., LTD., Aichi (JP)

(72) Inventor: Shinya Washino, Kasugai (JP)

(73) Assignee: KITAGAWA INDUSTRIES CO., LTD., Aichi (JP)

( * ) Notice: Subject to any disclaimer, the term of this patent is extended or adjusted under 35 U.S.C. 154(b) by 131 days.

(21) Appl. No.: 16/647,075

(22) PCT Filed: Sep. 20, 2017

(86) PCT No.: PCT/JP2017/033875
§ 371 (c)(1),
(2) Date: Mar. 13, 2020

(87) PCT Pub. No.: WO2019/058447
PCT Pub. Date: Mar. 28, 2019

(65) Prior Publication Data
US 2020/0207973 A1  Jul. 2, 2020

(51) Int. Cl.
| | | |
|---|---|---|
| *C08L 53/00* | (2006.01) |
| *B29B 7/82* | (2006.01) |
| *B29C 43/00* | (2006.01) |
| *C08K 3/22* | (2006.01) |
| *C08K 5/14* | (2006.01) |
| *C08K 9/04* | (2006.01) |
| *C08L 23/02* | (2006.01) |
| *C08L 91/00* | (2006.01) |
| *B29K 96/04* | (2006.01) |

(52) U.S. Cl.
CPC .............. *C08L 53/00* (2013.01); *B29B 7/82* (2013.01); *B29C 43/003* (2013.01); *C08K 3/22* (2013.01); *C08K 5/14* (2013.01); *C08K 9/04* (2013.01); *C08L 23/02* (2013.01); *C08L 91/00* (2013.01); *B29K 2096/04* (2013.01); *C08K 2003/2224* (2013.01); *C08K 2201/005* (2013.01); *C08L 2201/08* (2013.01); *C08L 2205/03* (2013.01); *C08L 2312/00* (2013.01)

(58) Field of Classification Search
CPC ................................................ C08L 91/00–09
See application file for complete search history.

(56) References Cited

U.S. PATENT DOCUMENTS

2003/0055166 A1    3/2003   Mizuno

FOREIGN PATENT DOCUMENTS

| CN | 101570618 | | 11/2009 |
|---|---|---|---|
| EP | 1801153 | A2 * | 6/2007 |
| JP | 2001-288332 | | 10/2001 |
| JP | 2004-75874 | | 3/2004 |
| JP | 2004-323553 | | 11/2004 |
| JP | 2006-225580 | | 8/2006 |
| JP | 2008-63431 | | 3/2008 |
| JP | 2009-91504 | | 4/2009 |
| JP | 2009-185214 | | 8/2009 |
| JP | 2010-24275 | | 2/2010 |
| JP | 2015-10206 | | 1/2015 |
| JP | 2016-89070 | | 5/2016 |
| JP | 2017-65186 | | 4/2017 |

OTHER PUBLICATIONS

International Search Report (ISR) dated Dec. 19, 2017 in International (PCT) Application No. PCT/JP2017/033875.

* cited by examiner

*Primary Examiner* — Ana L. Woodward
(74) *Attorney, Agent, or Firm* — Wenderoth, Lind & Ponack, L.L.P.

(57) ABSTRACT

A composition of the present invention includes: a styrene-based elastomer; a paraffin-based process oil; an olefin resin; a crosslinking agent including an organic peroxide; a crosslinking aid; an antioxidant; and a surface-treated filler obtained by surface treating particles formed from magnesium hydroxide with a higher fatty acid. The paraffin-based process oil has a kinematic viscosity at 40° C. of 300 mm²/s or greater. Furthermore, from 405 to 485 parts by mass of the paraffin-based process oil, from 9 to 13 parts by mass of the olefin resin, from 5 to 7 parts by mass of the crosslinking agent, from 13 to 15 parts by mass of the crosslinking aid, from 3 to 4 parts by mass of the antioxidant, and from 15 to 25 parts by mass of the surface-treated filler are respectively blended per 100 parts by mass of the styrene-based elastomer.

16 Claims, 1 Drawing Sheet

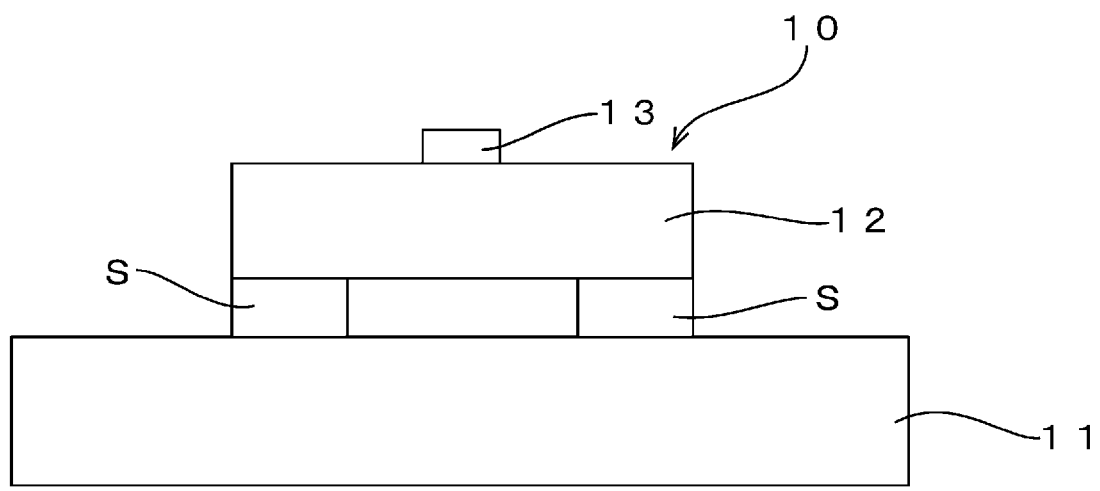

COMPOSITION, METHOD FOR PRODUCING HEAT-RESISTANT VIBRATION-PROOF MATERIAL, AND HEAT-RESISTANT VIBRATION-PROOF MATERIAL

TECHNICAL FIELD

The present invention relates to a composition, a method for producing a heat-resistant vibration-proof material, and a heat-resistant vibration-proof material.

BACKGROUND ART

Elastomer compositions in which a softener made from a paraffin oil or the like is added to a styrene-based elastomer are known (for example, see Patent Document 1). This type of elastomer composition excels in flexibility, compression set, vibration absorption, and the like and is used in various applications such as in cushioning materials and shock absorbing materials.

CITATION LIST

Patent Literature

Patent Document 1: Japanese Unexamined Patent Application Publication No. 2006-225580A

Technical Problems

The softener used in this type of elastomer composition has a lower molecular weight compared to a styrene-based elastomer or the like. Therefore, problems with this type of elastomer composition include insufficient heat resistance due to softener elution, resulting in the compression set at high temperature conditions (for example, 100° C.) becoming high.

Furthermore, with this type of elastomer composition, when a large amount of softener is added in order to, for example, ensure flexibility, the moldability (in particular, mold releasability) of the elastomer composition may worsen. In particular, when a softener having a high boiling point (high viscosity) is used for the purpose of improving heat resistance or the like, the moldability of the elastomer composition further worsens.

SUMMARY OF THE INVENTION

An object of the present invention is to provide, for example, a heat-resistant vibration-proof material excelling in heat resistance and moldability.

Solution to Problems

A composition of the present invention includes: a styrene-based elastomer; a paraffin-based process oil; an olefin resin; a crosslinking agent including an organic peroxide; a crosslinking aid; an antioxidant; and a surface-treated filler obtained by surface treating particles formed from magnesium hydroxide with a higher fatty acid. The paraffin-based process oil has a kinematic viscosity at 40° C. of 300 mm$^2$/s or greater. Furthermore, from 405 to 485 parts by mass of the paraffin-based process oil, from 9 to 13 parts by mass of the olefin resin, from 5 to 7 parts by mass of the crosslinking agent, from 13 to 15 parts by mass of the crosslinking aid, from 3 to 4 parts by mass of the antioxidant, and from 15 to 25 parts by mass of the surface-treated filler are respectively blended per 100 parts by mass of the styrene-based elastomer.

In the composition, the styrene-based elastomer is preferably a polystyrene-poly(ethylene-ethylene/propylene) block-polystyrene block copolymer.

In the composition, an average particle size of the surface-treated filler is preferably from 0.5 µm to 5 µm.

In the composition, the crosslinking aid is preferably composed of a polyfunctional (meth)acrylate compound.

Furthermore, a method for producing a heat-resistant vibration-proof material of the present invention is a method of producing a heat-resistant vibration-proof material by using any of the compositions, and the method includes a kneading step of kneading the composition and a molding step of heating and molding the composition after kneading.

In addition, a heat-resistant vibration-proof material of the present invention is formed from a heat molded article of any of the compositions and has an Asker FP hardness of 85 or less; and a compression set after heating for 22 hours at 120° C. of 85% or less.

With the heat-resistant vibration-proof material, a percentage of increase in resonance frequency after 2000 hours at 100° C. is preferably 10% or less.

Advantageous Effects of Invention

According to the present invention, a heat-resistant vibration-proof material excelling in heat resistance and moldability and the like can be provided.

BRIEF DESCRIPTIONS OF DRAWINGS

FIG. 1 is an explanatory diagram schematically illustrating a configuration of a vibration tester.

DESCRIPTION OF EMBODIMENTS

Composition

A composition according to the present invention is a composition for producing a heat-resistant vibration-proof material (hereinafter, a heat-resistant vibration-proof material composition). The heat-resistant vibration-proof material composition mainly includes: a styrene-based elastomer, a paraffin-based process oil, an olefin resin, a crosslinking agent formed from an organic peroxide, a crosslinking aid, an antioxidant, and a surface-treated filler in which particles formed from magnesium hydroxide are surface treated with a higher fatty acid.

Styrene-Based Elastomer

The styrene-based elastomer is one of the main materials constituting the heat-resistant vibration-proof material. Note that in the heat-resistant vibration-proof material, the styrene-based elastomer is partially crosslinked by the action of the crosslinking agent and the crosslinking aid.

Examples of styrene-based elastomers include polystyrene-poly(ethylene-ethylene/propylene) block-polystyrene block copolymers (SEEPS), polystyrene-poly(ethylene/propylene)-polystyrene block copolymers (SEPS), polystyrene-poly(ethylene/propylene) block copolymers (SEP), polystyrene-poly(ethylene/butylene)-polystyrene block copolymers (SEBS), polystyrene-polybutadiene block copolymers (SBC), and polystyrene-polyisoprene-polystyrene block copolymers (SIS). These may be used alone or in a combination of two or more types.

Examples of commercially-available styrene-based elastomers (for example, SEEPS) include a product of the trade name "Septon 4055" (available from Kuraray Co., Ltd.), a product of the trade name "Septon 4077" (available from Kuraray Co., Ltd.), and a product of the trade name "Septon 4099" (available from Kuraray Co., Ltd.).

Note that the styrene-based elastomer is preferably such that the styrene block is not a reaction crosslinking type. When the styrene block is a reaction crosslinking type (for example, product of the "Septon V" series (available from Kuraray Co., Ltd.)), the styrene block may be overly crosslinked by the action of the crosslinking agent and the crosslinking aid.

Paraffin-Based Process Oil

The paraffin-based process oil is one of the main materials constituting the heat-resistant vibration-proof material and imparts flexibility and the like to the heat-resistant vibration-proof material. As the paraffin-based process oil, a product having a kinematic viscosity at 40° C. of 300 mm$^2$/s or higher is used. The upper limit of the kinematic viscosity at 40° C. is not particularly limited but is, for example, not greater than 400 mm$^2$/s.

Examples of commercially-available paraffin-based process oils include a product of the trade name "PW-380" (kinematic viscosity (40° C.)=380 mm$^2$/s, available from Idemitsu Kosan Co., Ltd.), and the like.

In the heat-resistant vibration-proof material composition, the paraffin-based process oil is compounded at a ratio of from 405 to 485 parts by mass per 100 parts by mass of the styrene-based elastomer. When the compounded amount of the paraffin-based process oil is too large, the value of the compression set increases, and the hardness of the heat-resistant vibration-proof material increases.

Olefin Resin

The olefin resin is formed from a homopolymer or copolymer of olefins such as ethylene, propylene, and butene; or a copolymer with a monomer component that is copolymerizable with these olefins. Specific examples include polyethylene, polypropylene, ethylene-vinyl acetate copolymers, ethylene-ethyl acrylate copolymers, ethylene-acrylic acid copolymers, ethylene-methyl methacrylate copolymers, ethylene-α-olefin copolymers, ethylene-propylene copolymers, and ethylene-butene copolymers. These may be used alone or in a combination of two or more types. The olefin resin is preferably polypropylene from the perspectives of, for example, solubility with respect to a styrene-based elastomer or the like; and heat resistance.

In the heat-resistant vibration-proof material composition, the olefin resin is compounded at a ratio of from 9 to 13 parts by mass per 100 parts by mass of the styrene-based elastomer. When the compounded amount of the olefin resin is too large, kneading (mold releasability) and the like may be impaired, and when the compounded amount of the olefin resin is too small, heat resistance and the like may be impaired.

Crosslinking Agent

The crosslinking agent contains an organic peroxide, and when heated to a predetermined temperature or higher, radicals are generated, and the styrene-based elastomers are partially crosslinked. Examples of the crosslinking agent include 1,1-bis(t-butylperoxy)-3,5,5-trimethylcyclohexane, 2,5-dimethylhexane-2,5-dihydroperoxide, di-t-butyl peroxide, t-butyl cumyl peroxide, dicumyl peroxide, α,α-bis(t-butylperoxy)-p-diisopropyl benzene, 2,5-dimethyl-2,5-di(t-butylperoxy)hexane, 2,5-dimethyl-2,5-di(t-butylperoxy)-hexyne-3, benzoyl peroxide, t-butylperoxy benzene, t-butylperoxy maleic acid, t-butylperoxy isopropyl carbonate, and t-butyl peroxy benzoate. These may be used alone or in a combination of two or more types. The crosslinking agent is preferably 2,5-dimethyl-2,5-di(t-butylperoxy)-hexyne-3.

In the heat-resistant vibration-proof material composition, the crosslinking agent is compounded at a ratio of from 5 to 7 parts by mass per 100 parts by mass of the styrene-based elastomer. When the compounded amount of the crosslinking agent is too large, the heat-resistant vibration-proof material may become too hard and unmoldable, and when the compounded amount of the crosslinking agent is too small, the heat resistance and the like may be impaired.

Crosslinking Aid

The crosslinking aid is used in combination with the crosslinking agent, and has a function of, for example, promoting the crosslinking of the styrene-based elastomer. Examples of the crosslinking aid include triallyl cyanurate, trimethallyl isocyanurate, triallyl isocyanurate, triacrylformal, triallyl trimellitate, N,N'-m-phenylene bismaleimide, dipropagyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, triallyl phosphite, N,N-diallylacrylamide, 1,6-divinyl dodecafluorohexane, hexaallylphosphoramide, N,N,N',N'-tetraallylphthalamide, N,N,N',N'-tetraallyl malonamide, trivinylisocyanurate, 2,4,6-trivinylmethyl trisiloxane, tri(5-norbornene-2-methylene)cyanurate, and triallyl phosphite. These may be used alone or in a combination of two or more types. Note that a polyfunctional (meth)acrylate compound such as trimethallyl isocyanurate and triallyl isocyanurate is preferable as the crosslinking aid, and triallyl isocyanurate is particularly preferable.

In the heat-resistant vibration-proof material composition, the crosslinking aid is compounded at a ratio of from 13 to 15 parts by mass per 100 parts by mass of the styrene-based elastomer. When the compounded amount of the crosslinking aid is too large, moldability, and the like may be hindered, and when the compounded amount of the crosslinking aid is too small, the heat resistance, and the like may be impaired.

The compounded amount of the crosslinking aid is from 1.9 to 3.0 times and preferably from 2.0 to 2.8 times the compounded amount of the crosslinking agent.

Antioxidant

The antioxidant is used in combination with the crosslinking agent and the like and has a function of preventing the oxidation of the heat-resistant vibration-proof material composition. The antioxidant also has a function of adjusting the amount of the crosslinking of the styrene-based elastomer during the process of producing the heat-resistant vibration-proof material. As the antioxidant, for example, a phenol-based antioxidant containing a phenol-based hydroxyl group in the structure can be used. As a phenol-based antioxidant, a hindered phenol-based antioxidant is particularly favorable.

Examples of hindered phenol-based antioxidants include pentaerythritol tetrakis[3-(3,5-di-tert-butyl-4-hydroxyphenyl)propionate], thiodiethylene bis[3-(3,5 -di -tert-butyl-4-hydroxyphenyl)propionate], octadecyl-3-(3,5 -di-tert-butyl-4-hydroxyphenyl)propionate, and N,N'-hexane-1,6-diylbis [3-(3,5-di-tert-butyl-4-hydroxyphenylpropionamide).

In the heat-resistant vibration-proof material composition, the antioxidant is compounded at a ratio of from 3 to 4 parts by mass per 100 parts by mass of the styrene-based elastomer. When the compounded amount of the antioxidant is too large, the crosslinking of the styrene-based elastomer will not be sufficiently formed, and the heat resistance and the like of the heat-resistant vibration-proof material may be impaired, and when the compounded amount of the antioxidant is too small, oil bleeding will appear in the heat-resistant vibration-proof material after a heating treatment, and the heat resistance and the like may be impaired.

Surface-Treated Filler

The surface-treated filler is obtained by surface treating (subjecting to a coating treatment) particles made of magnesium hydroxide with a higher fatty acid. Examples of the higher fatty acid coating the magnesium hydroxide include palmitic acid, stearic acid, oleic acid, and linoleic acid. Of these, oleic acid is preferable. The average particle size of the surface-treated filler is preferably from 0.5 µm to 1.5 µm. Note that the particle size is expressed by an average particle size D50 determined by a method such as laser diffraction.

In the heat-resistant vibration-proof material composition, the surface-treated filler is compounded at a ratio of from 15 to 25 parts by mass per 100 parts by mass of the styrene-based elastomer. When the compounded amount of the surface-treated filler is too large, the heat resistance is impaired, the value of the compression set after a heating treatment increases, and the hardness (FP) also increases. When the compounded amount of the surface-treated filler is too small, the kneading properties of the composition are negatively affected, the heat resistance may be impaired, and oil bleeding may occur.

Other components may be further compounded in the heat-resistant vibration-proof material composition so long as the object of the present invention is not impaired. Examples of other components include colorants (pigments, dyes, and the like), carbon black, conductive fillers, ultraviolet absorbers, flame retardants, plasticizers, antiseptics, and solvents.

Method for Producing Heat-Resistant Vibration-Proof Material

The method for producing a heat-resistant vibration-proof material of the present invention is a method of producing a heat-resistant vibration-proof material by using the above-described heat-resistant vibration-proof material composition. The method for producing a heat-resistant vibration-proof material includes a kneading step of kneading the heat-resistant vibration-proof material composition and a molding step of heating and molding the heat-resistant vibration-proof material composition after kneading.

Kneading Step

In the kneading step, the heat-resistant vibration-proof material composition is melt-kneaded using a predetermined kneading device (for example, a Laboplastomil). Note that, in the kneading step, the composition is heated at a temperature lower than the reaction temperature of the crosslinking agent so that the crosslinking agent does not react (a crosslinking agent that reacts at a temperature higher than the heating temperature in the kneading step is used). Various conditions such as the kneading temperature and kneading time are appropriately set.

Molding Step

In the molding step, the heat-resistant vibration-proof material composition after kneading is heated and molded using a predetermined molding device (for example, a hot press). In the molding step, the composition is heated at a temperature equal to or higher than the reaction temperature of the crosslinking agent.

When the heat-resistant vibration-proof material composition is hot press molded (thermoformed) in this manner, a heat-resistant vibration-proof material formed from a cured product of the heat-resistant vibration-proof material composition is obtained.

Heat-Resistant Vibration-Proof Material

The heat-resistant vibration-proof material of the present invention excels in heat resistance (oil bleeding suppression, suppression of an increase in the compression set, suppression of an increase in hardness, etc.), moldability, flexibility, and the like. More specifically, the Asker FP hardness is 85 or less, and the compression set (after heating for 22 hours at 120° C.) is 85% or less. The heat-resistant vibration-proof material of the present invention, which excels in heat resistance, has a percentage of increase in resonance frequency of 10% or less (preferably 7% or less, and more preferably 5% or less) after 2000 hours at 100° C.

Note that the heat-resistant vibration-proof material composition of the present invention has excellent kneading properties, moldability (mold releasability), and the like.

EXAMPLES

Example 1

Preparation of Composition

Amounts of 400 parts by mass of a paraffin-based process oil (trade name "PW-380", available from Idemitsu Kosan Co., Ltd.), 9.55 parts by mass of polypropylene (trade name "J2021GR", available from Prime Polymer Co., Ltd.), 3.37 parts by mass of an antioxidant (pentaerythritol tetrakis[3-(3,5-di-tert-butyl-4-hydroxyphenyl) propionate], trade name "#1010", available from BASF Japan Ltd.), 19.7 parts by mass of a surface-treated filler (filler obtained by treating the surface of magnesium hydroxide having an average particle size of about 1µm with oleic acid; trade name "N-4", available from Konoshima Chemical Co., Ltd.), 6 parts by mass of carbon black (trade name "#900B", available from Mitsubishi Chemical Corporation), 5.62 parts by mass of a crosslinking agent (organic peroxide, 2,5-dimethyl-2,5-bis (t-butylperoxy)hexyne-3, trade name "Perhexyne 25B-40"; NOF Corporation), and a crosslinking aid (triallyl isocyanurate, trade name "TAIC WH-60", available from Nihon Kasei Co., Ltd.) were blended per 100 parts by mass of a styrene-based elastomer (SEEPS, trade name "Septon 4055", available from Kuraray Co., Ltd.), and the mixture was kneaded using a Laboplastomil (model No.: 150C, available from Toyo Seiki Seisaku-sho, Ltd.) (kneading step). The temperature conditions at the time of kneading were set to 180° C., which is equal to or higher than the melting temperature of the styrene-based elastomer and the olefin resin and lower than the reaction temperature of the crosslinking agent. The kneading time was set to 5 minutes.

Production of Heat-Resistant Vibration-Proof Material

The composition obtained after kneading was first subjected to coarse powder processing, after which the coarse powdered composition was hot pressed (heat molded) using a press at conditions including a temperature of 200° C., preheating for 1 minute, pressurizing for 3 minutes, and a pressure of 7 t, and a sheet-like heat-resistant vibration-proof material was obtained (molding step).

Example 2

A composition was produced in the same manner as in Example 1 with the exception that the compounded amount of the crosslinking aid was changed to 16.9 parts by mass, and a sheet-like heat-resistant vibration-proof material was obtained using the composition thereof.

Example 3

A composition was produced in the same manner as in Example 1 with the exception that the styrene-based elastomer (SEEPS) was changed to 100 parts by mass of a product of the trade name "Septon 4077" (available from Kuraray Co., Ltd.), and a sheet-like heat-resistant vibration-proof material was obtained using the composition thereof.

Example 4

A composition was produced in the same manner as in Example 1 with the exception that the styrene-based elastomer (SEEPS) was changed to 100 parts by mass of a product of the trade name "Septon 4099" (available from Kuraray Co., Ltd.), and a sheet-like heat-resistant vibration-proof material was obtained using the composition thereof.

Comparative Examples 1 to 11

Compositions of Comparative Examples 1 to 11 were prepared in the same manner as in Example 1 with the formulations shown in Table 1, and a sheet-like molded article was obtained using the composition thereof.

Note that the compounded amounts of the compositions shown in Table 1 are based on units of "parts by mass". Also, in Table 1, the product of the trade name "Septon 4055" is designated as "SEEPS (1)", product of the trade name "Septon 4077" is designated as "SEEPS (2)", and product of the trade name "Septon 4099" is designated as "SEEPS (3)". In addition, "stearic acid Ca" in Table 1 is calcium stearate, and a product of the trade name "Die Wax" (available from Tannan Kagaku Kogyo Co., Ltd.) was used.

Evaluation

Kneadability

In each of the examples and the comparative examples, the kneadability (mold releasability) during the kneading step of the composition described above was visually determined. The results are shown in Table 1. Note that in Table 1, cases in which the mold releasability with respect to the Laboplastomil during the kneading step was good are indicated by "good", and cases in which the mold releasability with respect to the Laboplastomil was poor are indicated by "poor".

Moldability

In each of the examples and the comparative examples, the appearance of the heat-resistant vibration-proof material and the like, which were obtained after the abovementioned composition molding step, was visually determined. The results are shown in Table 1. Note that in Table 1, cases with no appearance-related problems are indicated by "good", and cases with an appearance-related problem (for example, the appearance of a bloom on the surface of the molded article, etc.) are indicated by "poor".

Oil Bleeding

The heat-resistant vibration-proof material of each of the examples and the molded articles of each of the comparative examples were left to stand for 24 hours under 100° C. temperature conditions, after which the presence or absence of oil bleeding was visually determined. The results are shown in Table 1. Note that in Table 1, cases with no oil bleeding are indicated by "none", and cases with oil bleeding are indicated by "present".

Compression Set

Respective test pieces (diameter 13 mm, thickness 6 mm) were cut out from each of the sheets (heat-resistant vibration-proof material, molded article) of the examples and comparative examples, and the compression set was measured in accordance with JIS K6262 using the test pieces. Specifically, each test piece (thickness D) was compressed 25% (to a thickness DO in the thickness direction using a prescribed compression device (compression jig), was then placed in that state in an environmental tester (constant-temperature bath) at 100° C., and was left to stand in the environmental tester for 22 hours. Subsequently, the test piece was removed from the environmental tester, the compression device compressing the test piece was released, after the test piece was left to stand at ambient temperature for 30 minutes or longer on a wood board, the thickness (thickness D2) of the test piece was measured, and the compression set (%) was determined from the equation of $(D-D2)/(D-D1) \times 100$. The results are shown in Table 1. Note that cases in which the compression set was 50% or less were determined to be "good" and are indicated by "good" in Table 1. In addition, cases in which the compression set exceeded 50% were determined to be "poor" and are indicated by "poor" in Table 1.

Hardness

The hardness of the sheets (heat-resistant vibration-proof material, molded article) of each of the examples and comparative examples was measured using an Asker FP hardness meter. The results are shown in Table 1. Note that cases in which the hardness was 85 or less were determined to be "good" and are indicated by "good" in Table 1. In addition, cases in which the hardness exceeded 85 were determined to be "poor" and are indicated by "poor" in Table 1.

TABLE 1

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Composition | SEEPS (1) | 100 | 100 |  |  | 100 | 100 | 100 | 100 |
|  | SEEPS (2) |  |  | 100 |  |  |  |  |  |
|  | SEEPS (3) |  |  | 100 |  |  |  |  |  |
|  | Process oil | 405 | 405 | 405 | 405 | 405 | 405 | 405 | 405 |
|  | PP | 9.55 | 9.55 | 9.55 | 9.55 | 11.2 | 14 | 9.55 | 9.55 |
|  | Antioxidant | 3.37 | 3.37 | 3.37 | 3.37 | 3.36 | 3.4 | 3.37 | 3.37 |
|  | Surface-treated filler | 19.7 | 19.7 | 19.7 | 19.7 | 20 | 20 | 19.7 | 19.65 |
|  | Stearic acid Ca |  |  |  |  |  |  |  |  |
|  | Carbon black | 6 | 6 | 6 | 6 | 6 | 6 | 6 | 6 |

TABLE 1-continued

| | | | | | | | | | |
|---|---|---|---|---|---|---|---|---|---|
| | Crosslinking agent | 5.62 | 5.62 | 5.62 | 5.62 | 5.6 | 5.5 | 5.62 | 5.62 |
| | Crosslinking aid | 14.1 | 16.9 | 14.1 | 14.1 | 11.2 | 11 | 11.2 | 19.7 |
| Evaluation | Kneadability | Good | Good | Good | Good | Good | Good | Good | Good |
| | Moldability | Good | Good | Good | Good | Good | Good | Good | Poor |
| | Oil Bleeding (100° C., 24 hours) | None | None | None | None | None | None | None | None |
| | Compression Set (%) (120° C., 22 hours) | Good (41.3) | Good 48 | Good (43.4) | Good (41.8) | Poor (59.7) | Poor (58) | Poor (63.5) | Good (48.7) |
| | Hardness (FP) | Good (83) | Good (83) | Good (83) | Good (83) | Poor (86) | Poor (88) | Good (83) | Good (83) |

| | | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|
| Composition | SEEPS (1) | 100 | 100 | 100 | 100 | | 100 | 100 |
| | SEEPS (2) | | | | | | | |
| | SEEPS (3) | | | | | 100 | | |
| | Process oil | 450 | 550 | 550 | 450 | 450 | 450 | 450 |
| | PP | 12.5 | 25 | 25 | 12.5 | 12.5 | 12.5 | 12.5 |
| | Antioxidant | 3.65 | 2.9 | 2.9 | 3.65 | 3.7 | 3.65 | 3.7 |
| | Surface-treated filler | 10 | | 20 | 20 | 20 | 30 | |
| | Stearic acid Ca | | | | | | | 20 |
| | Carbon black | 6 | 6 | 6 | 6 | 6 | 6 | 6 |
| | Crosslinking agent | | 6 | 6 | 6 | 6 | 6 | 6 |
| | Crosslinking aid | | 12 | 12 | 12 | 12 | 12 | 12 |
| Evaluation | Kneadability | Poor | Poor | Good | Good | Good | Good | Poor |
| | Moldability | Good | Good | Good | Good | Good | Good | Good |
| | Oil Bleeding (100° C., 24 hours) | None | Present | Present | None | None | None | None |
| | Compression Set (%) (120° C., 22 hours) | Poor (63.3) | — | Poor (61.3) | Poor (61.6) | Poor (60.1) | Poor (64.9) | Poor (71.7) |
| | Hardness (FP) | Poor (88) | Poor (88) | Poor (88) | Poor (88) | Poor (88) | Poor (88) | Poor (88) |

As shown in Table 1, it was confirmed that the sheets (heat-resistant vibration-proof material) of Examples 1 to 4 had excellent kneadability (mold releasability) and moldability. Furthermore, even after heating the sheets of Examples 1 to 4 at 100° C. for 24 hours, no oil bleeding was observed, and the compression set after 22 hours at 120° C. also resulted in excellent results. It was also confirmed that the sheets (heat-resistant vibration-proof materials) of Examples 1 to 4 exhibited levels of hardness that were equivalent to the hardness (83) of a known product described below (Comparative Example 12) and excelled in flexibility.

In contrast, in Comparative Examples 1 to 11, the sheets that satisfied all of the evaluation results were not obtained. Note that the moldability of Comparative Example 4 was evaluated as being "poor". This is because the crosslinking aid precipitated (bloomed) on the surface of the molded article.

Heat Resistance Test: Vibration Characteristics

Heat resistance tests were performed on the sheet (heat-resistant vibration-proof material) of Example 1 and on the sheet (molded article) of the Comparative Example 12 described below, and changes in the vibration characteristics before and after the heat resistance tests were confirmed. First, the sheet of Comparative Example 12 will be described.

Comparative Example 12

Amounts of 375 parts by mass of a paraffin-based process oil (trade name "PW-32", available from Idemitsu Kosan Co., Ltd.), 0.96 parts by mass of an antioxidant (pentaerythritol tetrakis[3-(3,5-di-tert-butyl-4-hydroxyphenyl)propionate], trade name "#1010", available from BASF Japan Ltd.), and 4.8 parts by mass of carbon black (trade name "#900B", available from Mitsubishi Chemical Corporation) were blended per 100 parts by mass of a styrene-based elastomer (SEEPS, trade name "Septon 4055", available from Kuraray Co. Ltd.), and the mixture was kneaded under the same conditions as in Example 1 to obtain a composition of Comparative Example 12. Furthermore, the obtained composition was hot-press molded under the same conditions as in Example 1, and a sheet-like molded article was obtained.

Preparation of Test Pieces

Four test pieces having a length of 5 mm, a width of 5 mm, and a thickness of 3 mm were cut out from each sheet of Example 1 and Comparative Example 12.

Heat Resistance Test

Each test piece of Example 1 and Comparative Example 12 was left to stand for 2000 hours under a temperature condition of 100° C.

Evaluation of Vibration Characteristics

For each of the test pieces of Example 1 and Comparative Example 12, the vibration characteristics were evaluated a total of four times using a vibration tester 10 described below before the heat resistance test (0 hours), and at 500 hours, 1000 hours, and 2000 hours after starting the test.

FIG. 1 is an explanatory diagram schematically illustrating a configuration of the vibration tester 10. The "F-300 BM/A" (available from Emic Corporation, fully-automatic vibration tester) was used as the vibration tester 10. The vibration tester 10 is a device that generates a vibration frequency of a predetermined frequency and vibrates an excitation table 11. The excitation direction is the vertical direction in FIG. 1 (the thickness direction of a test piece S). In addition to the excitation table 11, the vibration tester 10 also includes a mounting plate 12. The mounting plate 12 is square from a plan view and has a mass set to 400 g. Note that the evaluation of the vibration characteristics using the vibration tester 10 was conducted in a room temperature environment of 23° C.

As illustrated in FIG. 1, four test pieces S are disposed at each of the four corners of the mounting plate 12 and are arranged so as to be sandwiched between the mounting plate 12 and the excitation table 11. In other words, the mounting plate 12 is in a state of being supported at four points by the test pieces S on the excitation table 11.

In such a state, the excitation table 11 was excited at conditions including an acceleration of 0.4 G, a frequency of from 10 Hz to 1000 Hz, and a sweep rate of 458 seconds/sweep. The vibration of the mounting plate 12 was detected by an accelerometer 13 attached to the mounting plate 12, and the vibration characteristics were evaluated based on the detection results. The results are shown in Table 2.

The coefficient of loss was calculated from the following equation (1) based on a resonance frequency f0 (Hz) that indicated the peak value (resonant magnification) of the resonance curve obtained from the detection results of the accelerometer 13 and based on frequencies f1, f2 (f1<f0<f2) that indicated values that were 3 dB lower than the peak value thereof (half width method).

$$\tan\delta = (f2-f1)/f0 \tag{1}$$

TABLE 2

| | | 0 h | 500 h | 1000 h | 2000 h |
|---|---|---|---|---|---|
| Example 1 | Measured temperature/humidity | 23° C./43% | 23° C./43% | 23° C./45% | 23° C./43% |
| | Resonance frequency | 34.9 Hz | 37 Hz | 36.7 Hz | 36.2 Hz |
| | Maximum vibration transmission rate | 4.99 | 5.69 | 5.66 | 5.69 |
| | Coefficient of loss | 0.19 | 0.18 | 0.18 | 0.18 |
| | Crossover frequency | 52.5 Hz | 54.1 Hz | 54.0 Hz | 53.7 Hz |
| Comparative Example 12 | Measured temperature/humidity | 23° C./43% | 23° C./43% | 23° C./45% | 23° C./43% |
| | Resonance frequency | 32.6 Hz | 40.5 Hz | 40.1 Hz | 41.3 Hz |
| | Maximum vibration transmission rate | 9.97 | 11.35 | 11.93 | 12.17 |
| | Coefficient of loss | 0.06 | 0.06 | 0.06 | 0.06 |
| | Crossover frequency | 49.4 Hz | 61.0 Hz | 60.0 Hz | 62.1 Hz |

As shown in Table 2, in Example 1, the difference between the resonance frequency (34.9 Hz) before starting the test (0 hours) and the resonance frequency (36.2 Hz) 2000 hours after starting the test was 1.3 Hz. In addition, in Example 1, the percentage of increase in the resonance frequency after 2000 hours at 100° C. with respect to the resonance frequency before starting the test was 3.7% (=1.3/34.9×100), and it was confirmed that the vibration characteristics (vibration-proof property, etc.) were maintained.

In contrast, in Comparative Example 12, the difference between the resonance frequency (32.6 Hz) before starting the test (0 hours) and the resonance frequency (41.3 Hz) 2000 hours after starting the test was 8.7 Hz. In Comparative Example 12, the percentage of increase in the resonance frequency after 2000 hours at 100° C. with respect to the resonance frequency before starting the test was 26.7% (=8.7/32.6×100), and it was confirmed that the vibration characteristics (vibration-proof property, etc.) were not maintained.

REFERENCE SIGNS LIST

10: Vibration tester
11: Excitation table
12: Mounting plate
13: Accelerometer
S: Test piece (heat-resistant vibration-proof material)

The invention claimed is:
1. A composition comprising:
a styrene-based elastomer;
a paraffin-based process oil;
an olefin resin;
a crosslinking agent including an organic peroxide;
a crosslinking aid;
an antioxidant; and
a surface-treated filler obtained by surface treating particles formed from magnesium hydroxide with a higher fatty acid, wherein
the paraffin-based process oil has a kinematic viscosity at 40° C. of 300 mm$^2$/s or greater;
the styrene-based elastomer is at least one selected from the group consisting of a polystyrene-poly(ethylene-ethylene/propylene) block-polystyrene block copolymer (SEEPS), polystyrene-poly(ethylene/propylene)-polystyrene block copolymer (SEPS), polystyrene-poly(ethylene/propylene) block copolymer (SEP), polystyrene-poly(ethylene/butylene)-polystyrene block copolymer (SEBS), polystyrene-polybutadiene block copolymer (SBC), and polystyrene-polyisoprene-polystyrene block copolymer (SIS);
the olefin resin is at least one selected from the group consisting of a polyethylene, polypropylene, ethylene-vinyl acetate copolymer, ethylene-ethyl acrylate copolymer, ethylene-acrylic acid copolymer, ethylene- methyl methacrylate copolymer, ethylene-α-olefin copolymer, ethylene-propylene copolymer, and ethylene-butene copolymer;

the crosslinking agent including an organic peroxide is at least one selected from the group consisting of a 1,1-bis(t-butylperoxy)-3,5,5-trimethylcyclohexane, 2,5-dimethylhexane-2,5-dihydroperoxide, di-t-butyl peroxide, t-butyl cumyl peroxide, dicumyl peroxide, α,α-bis(t-butylperoxy)-p-diisopropyl benzene, 2,5-dimethyl-2,5-di(t-butylperoxy)hexane, 2,5-dimethyl-2,5-di(t-butylperoxy)-hexyne-3, benzoyl peroxide, t-butylperoxy benzene, t-butylperoxy maleic acid, t-butylperoxy isopropyl carbonate, and t-butyl peroxy benzoate;

the crosslinking aid is at least one selected from the group consisting of a triallyl cyanurate, trimethallyl isocyanurate, triallyl isocyanurate, triacrylformal, triallyl trimellitate, N,N'-m-phenylene bismaleimide, dipropagyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, triallyl phosphite, N,N-diallylacrylamide, 1,6-divinyl dodecafluorohexane, hexaallylphosphoramide, N,N,N',N'-tetraallylphthalamide, N,N,N',N'-tetraallyl malonamide, trivinylisocyanurate, 2,4,6-trivinylmethyl trisiloxane, tri(5-norbornene-2-methylene)cyanurate, and triallyl phosphite;

the higher fatty acid is at least one selected from the group consisting of a palmitic acid, stearic acid, oleic acid, and linoleic acid; and from 405 to 485 parts by mass of the paraffin-based process oil, from 9 to 13 parts by mass of the olefin resin, from 5 to 7 parts by mass of the crosslinking agent, from 13 to 15 parts by mass of the crosslinking aid, from 3 to 4 parts by mass of the antioxidant, and from 15 to 25 parts by mass of the surface-treated filler are respectively blended per 100 parts by mass of the styrene-based elastomer.

2. The composition according to claim 1, wherein the styrene-based elastomer is the polystyrene-poly(ethylene-ethylene/propylene) block-polystyrene block copolymer.

3. The composition according to claim 2, wherein an average particle size of the surface-treated filler is from 0.5 µm to 5 µm.

4. The composition according to claim 2, wherein the crosslinking aid includes trimethallyl isocyanurate and/or triallyl isocyanurate.

5. A method for producing a heat-resistant vibration-proof material using the composition described in claim 2, the method comprising:
kneading the composition; and
heating and molding the composition after kneading.

6. A heat-resistant vibration-proof material comprising a heat molded article of the composition described in claim 2, wherein the heat-resistant vibration-proof material has an Asker FP hardness of 85 or less; and
a compression set after heating for 22 hours at 120° C. of 85% or less.

7. The composition according to claim 1, wherein an average particle size of the surface-treated filler is from 0.5 µm to 5 µm.

8. The composition according to claim 7, wherein the crosslinking aid includes trimethallyl isocyanurate and/or triallyl isocyanurate.

9. A method for producing a heat-resistant vibration-proof material using the composition described in claim 7, the method comprising:
kneading the composition; and
heating and molding the composition after kneading.

10. A heat-resistant vibration-proof material comprising a heat molded article of the composition described in claim 7, wherein
the heat-resistant vibration-proof material has an Asker FP hardness of 85 or less; and
a compression set after heating for 22 hours at 120° C. of 85% or less.

11. The composition according to claim 1, wherein the crosslinking aid includes trimethallyl isocyanurate and/or triallyl isocyanurate.

12. A method for producing a heat-resistant vibration-proof material using the composition described in claim 11, the method comprising:
kneading the composition; and
heating and molding the composition after kneading.

13. A heat-resistant vibration-proof material comprising a heat molded article of the composition described in claim 11, wherein
the heat-resistant vibration-proof material has an Asker FP hardness of 85 or less; and
a compression set after heating for 22 hours at 120° C. of 85% or less.

14. A method for producing a heat-resistant vibration-proof material using the composition described in claim 1, the method comprising:
kneading the composition; and
heating and molding the composition after kneading.

15. A heat-resistant vibration-proof material comprising a heat molded article of the composition described in claim 1, wherein
the heat-resistant vibration-proof material has an Asker FP hardness of 85 or less; and
a compression set after heating for 22 hours at 120° C. of 85% or less.

16. The heat-resistant vibration-proof material according to claim 15, wherein a percentage of increase in resonance frequency after 2000 hours at 100° C. is 10% or less.

* * * * *